United States Patent [19]

Monoi et al.

[11] Patent Number: 5,600,159
[45] Date of Patent: Feb. 4, 1997

[54] SOLID STATE IMAGE SENSING DEVICE HAVING FACILITATED OUTPUT SIGNAL CORRECTION

[75] Inventors: Makoto Monoi, Tokyo-To; Kenji Suzuki, Chigasaki; Kiyoshi Fujii, Yokohama, all of Japan

[73] Assignee: Kabushiki Kaisha Toshiba, Kanagawa-Ken, Japan

[21] Appl. No.: 358,628

[22] Filed: Dec. 14, 1994

[30] Foreign Application Priority Data

Dec. 15, 1993 [JP] Japan .................................. 5-342217

[51] Int. Cl.$^6$ ................................................ H01L 27/148
[52] U.S. Cl. ........................... 257/222; 257/229; 257/232; 257/246; 257/223; 377/58
[58] Field of Search .................................. 257/215, 222, 257/224, 225, 232, 229, 242, 246, 249, 250, 238, 223; 377/57, 58, 60

[56] References Cited

U.S. PATENT DOCUMENTS

| | | | |
|---|---|---|---|
| 4,443,886 | 4/1984 | Matsumoto et al. | 257/250 |
| 4,541,068 | 9/1985 | Tower | 364/825 |
| 4,551,757 | 11/1985 | Ohkubo et al. | 358/212 |
| 4,912,560 | 3/1990 | Osawa et al. | 358/213.31 |

FOREIGN PATENT DOCUMENTS

| | | | |
|---|---|---|---|
| 0033129A1 | 8/1981 | European Pat. Off. | |
| 0398228A2 | 11/1990 | European Pat. Off. | |
| 0444696A2 | 9/1991 | European Pat. Off. | |
| 0553869A2 | 8/1993 | European Pat. Off. | 257/222 |

*Primary Examiner*—Minhloan Tran
*Attorney, Agent, or Firm*—Finnegan, Henderson, Farabow, Garrett & Dunner, L.L.P.

[57] ABSTRACT

A solid state image sensing device has a photoelectric transfer section for transducing incident light into signal charges, at least firs% and second charge transfer paths, a charge transferring section for transferring the signal charges from the photoelectric transfer section to the first path at a first timing and for transferring the signal charges transferred to the first path to the second path at a second timing and a charge supply section for applying bias charges to the signal charges to be transferred from the first to the second path. In the device, bias charges supplied to the first path is transferred to the second path. Signal charges are transferred to the first path and then to the second path. The signal and the bias charges both transferred to the second path are outputted.

19 Claims, 18 Drawing Sheets

SOLID STATE IMAGE SENSING DEVICE HAVING FACILITATED OUTPUT SIGNAL CORRECTION

BACKGROUND OF THE INVENTION

The present invention relates to a solid state image sensing device, and more specifically to a solid state image sensing device of multiline CCD (charge coupled device) register structure.

Recently, with the advance of higher resolution and higher speed of image reading devices, a multiline CCD image sensor has been known as an image sensor suitable for the image reading devices. An example of this image sensor is composed of a photoelectric transfer elements arranged in a straight line (each element of which corresponds to one pixel), a shift register, two-stage charge transfer sections (registers) composed of a plurality of CCDs, and an output section (buffer).

The signal charges generated by the photoelectric transfer elements are transferred to the charge transfer section via a shift gate at a predetermined timing and further transferred to the output section at another predetermined timing for conversion into voltage signals.

In this multiline CCD register structure, however, in case there exists defects in the charge transfer paths between the initial stage register and the succeeding stage register, charges tend to remain when being transferred between these registers. These remaining charges cause a factor of image defects. In addition, there exists such a tendency that a constant magnitude of charge remains only when the signal charge exceeds a predetermined level.

FIG. 1 shows the relationship between the signal charge generated by the photoelectric transfer section and output charge outputted after transferred between the two registers, in which 1 denotes the normal charge; 2 denotes the abnormal charge excluding the remaining charge, and 3 denotes the abnormal charge including the remaining charge. As shown in FIG. 1, when the magnitude of the signal charge is small, the relationship between both becomes non-linear characteristics, so that it has become difficult to correct the signal charges through signal processing.

SUMMARY OF THE INVENTION

With these problems in mind, therefore, it is the object of the present invention to provide a solid state image sensing device of multiline CCD structure, which can correct the signal output easily even if remaining charges exist during charge transfer between registers or can eliminate the remaining charges apparently.

To achieve the above-mentioned object, the present invention provides a solid state image sensing device, comprising: photoelectric transferring means composed of a plurality of photoelectric transfer elements arranged in a straight line, for transducing incident light into signal charges; at least first and second charge transfer paths arranged in parallel to the photoelectric transfer elements and each having a plurality of charge coupled devices, for transferring the signal charges; charge transferring means for transferring the signal charges from said photoelectric transferring means to said first charge transfer path at a first timing and for transferring the signal charges transferred to said first charge transfer path to said second charge transfer path at a second timing; and charge supplying means for applying a bias charge to the signal charges to be transferred from said first charge transfer path to said second charge transfer path.

Here, the charge supplying means comprises a charge input drain region for transducing incident light into the bias charge and a charge input electrode for applying the bias charge to the signal charges to be transferred, both the charge input drain region and electrode being formed on a semiconductor substrate. Further, the image sensing device further comprises discharging means for discharging the bias charge from said first and second charge transfer paths, respectively.

Further, the present invention provides a method of transferring charges in a solid state image sensing device having at least first and second charge transfer paths for transferring signal charges and charge transferring means for transferring the signal charges between the first and second charge transfer paths, which comprises the steps of: supplying a bias charge to the first charge transfer path; transferring the bias charge from the first charge transfer path to the second charge transfer path; supplying the signal charges to the first charge transfer path; transferring the signal charges from the first charge transfer path to the second charge transfer path; and outputting the signal charges and the bias charge both transferred to the second charge transfer path.

Further, it is preferable that the method of transferring charges further comprises the step of discharging the bias charge from the second charge transfer path. Further, it is preferable that before the signal charges are transferred to the second charge transfer path, the bias charge is outputted from the second charge transfer path; and the outputted bias charge is subtracted from a charge composed of the signal charge and the bias charge both outputted from the second charge transfer path, to obtain a signal output charge.

DETAILED DESCRIPTION OF THE EMBODIMENTS

Figure 1:
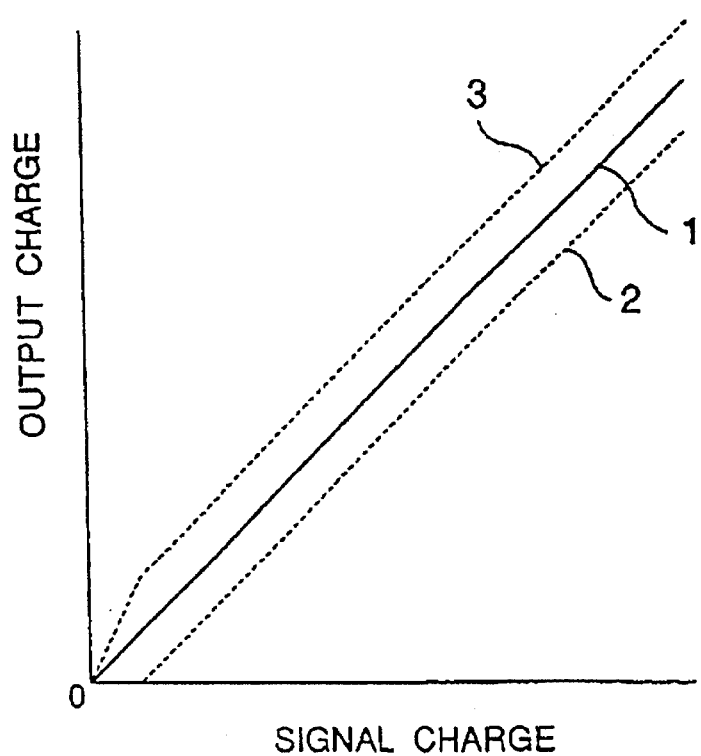
FIG. 1 is a characteristic diagram showing the relationship between the signal charge and the output charge output after transfer between the registers in the prior art image sensing device.
Figure 2:
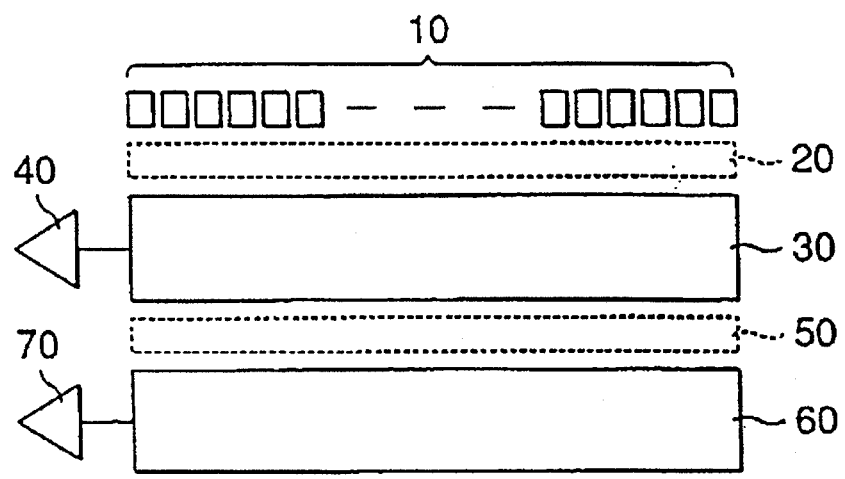
FIG. 2 is a plan view showing a linear image sensor of multiline CCD structure.

FIG. 2 shows an image sensor of multiline CCD register structure according to the present invention, which is formed on a semiconductor substrate. The image sensor is composed of a photoelectric transfer element line 10 (each element of which corresponds to one pixel), a shift register 20, two stage charge transfer sections (registers) 30 and 60 each composed of a plurality of CCDs, a transfer gate 50, and two output sections (buffers) 40 and 70.

Figure 3:
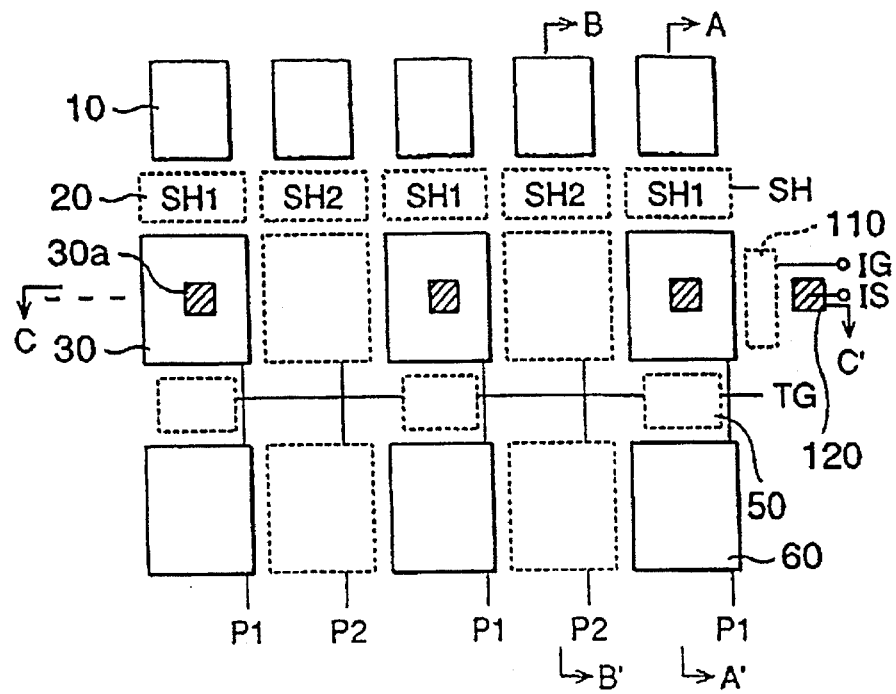
FIG. 3 is a partial plan view showing a first embodiment of the solid state image sensing device according to the present invention.

FIG. 3 is an enlarged plane view showing a part of the image sensor shown in FIG. 2. In FIG. 3, the shift gate 20 and the transfer gate 50 are connected to dedicated drive pulse lines SH (SH1 and SH2) and TG, respectively. Further, drive pulse lines P1 and P2 are connected alternately to the arranged transfer electrodes of the CCD registers 30 and 60, respectively.

Further, as shown in FIG. 3, the drive pulse lines SH1 and SH2 are connected alternately to the arranged electrodes of the shift gate 20. That is, the respective electrodes of the shift gate 20 are arranged and connected alternately to either of the drive pulse lines SH1 or SH2. Further, since the shift gates 20 shown in figures other than FIG. 3 are of the same structure as that shown in FIG. 3, the reference symbols SH1 and SH2 are omitted herein in the other figures.

Figure 4:
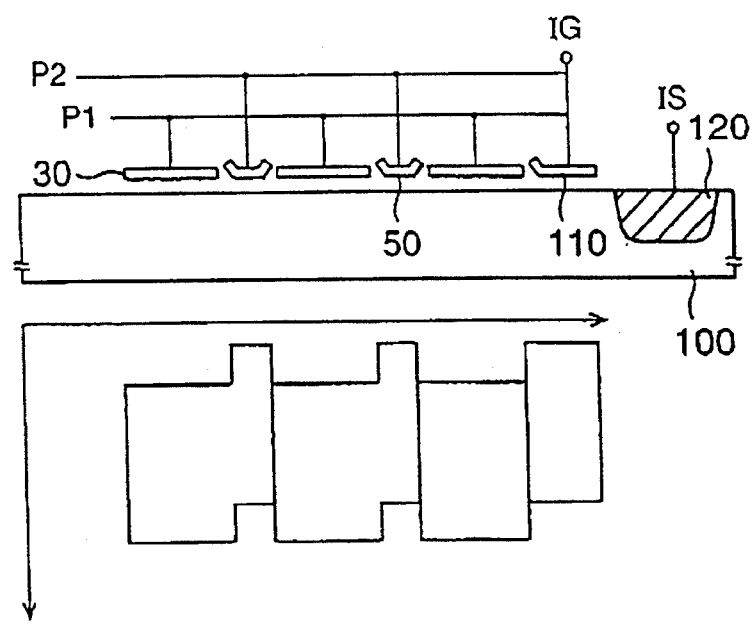
FIG. 4 is a cross-sectional view taken along a line C—C' in FIG. 3.
Figure 5:
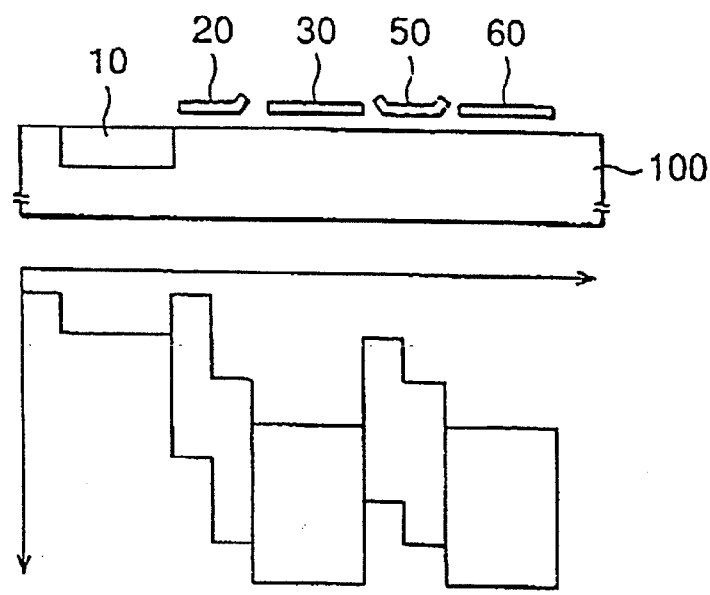
FIG. 5 is a cross-sectional view taken along a line A—A' in FIG. 3.
Figure 6:
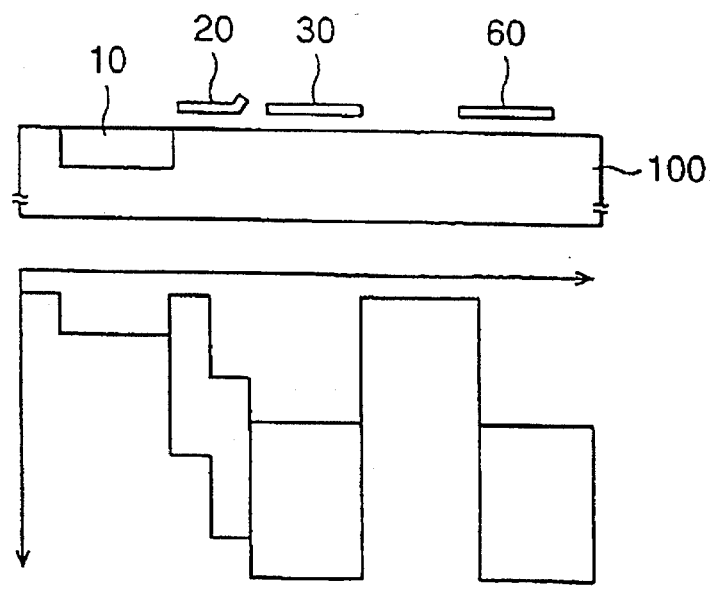
FIG. 6 is a cross-sectional view taken along a line B—B' in FIG. 3.

The drive pulse line SH1 is connected to the electrode as arranged alternately along the A—A' line portion shown in FIG. 3, and the drive pulse line SH2 is connected to the electrode as arranged alternately along the B—B' line portion shown in FIG. 3. As shown in FIGS. 4 to 6 (which correspond to the cross-sectional views taken along the lines C—C', A—A' and B—B' all shown in FIG. 3), each photoelectric transfer element 10 is formed in an impurity diffusion region formed in a surface of a semiconductor substrate 100. Further, the shift gate 20, the transfer gate 50, and the CCD registers 30 and 60 are composed of electrodes (e.g., formed of polysilicon) formed on the semiconductor substrate 100, respectively. Further, in this embodiment, an input section is composed of a charge input electrode 110 and a charge input drain region 120 both formed in the CCD register 30 to inject fat zero charge bias charge) to the CCD register S0. The charge input electrode 110 is an electrode formed of polysilicon on the semiconductor substrate 100. The charge input electrode 110 is connected to a drive pulse line IG, and the charge input drain region 120 is connected to a drive pulse line 18. Further, the input section 120 is formed by an impurity diffusion region formed in the surface of the semiconductor substrate 100, which constitutes a kind of photoelectric transfer section for obtaining the fat zero charge on the basis of light incident thereupon.

Figure 10:
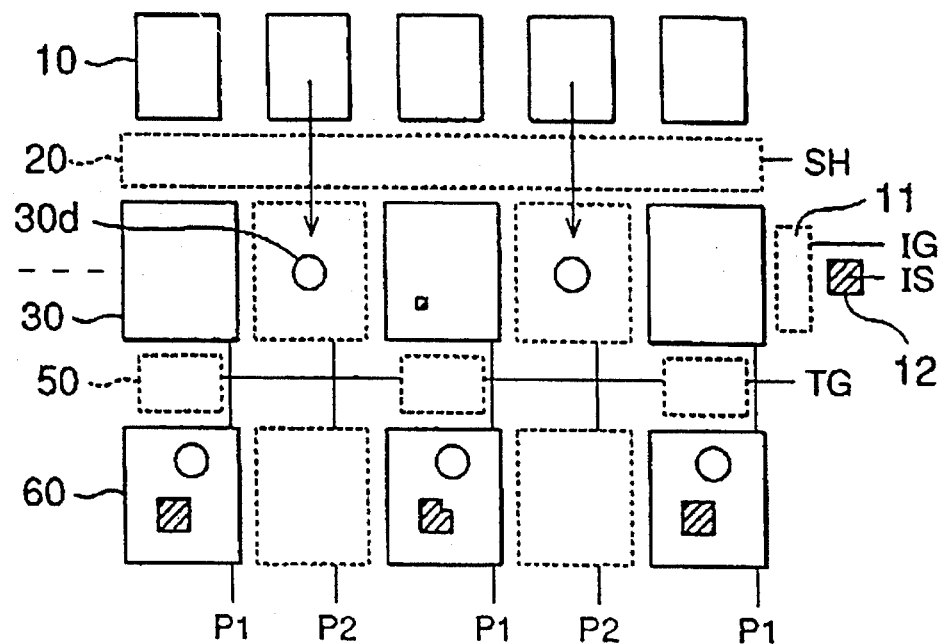

With reference to FIGS. 3, 7 to 9 and 12 (timing chart), the operation of the image sensor according to the present invention will be described hereinbelow. First, at time t1, the drive pulse line IG connected to the input section 110 is turned on to inject fat zero charges 30a from the input section 110 to the CCD register 30 (see FIG. 3). Further, at time t2, the drive pulse line TG connected to the transfer gate 50 is turned on to transfer the fat zero charges 30a from the CCD register 30 to the CCD register 60 (see FIG. 7). Further, at this time, in case there exists a defect in a charge transfer-path (not shown) between the CCD 31 of the CCD register 30 and the CCD 61 of the CCD register 60 (as shown at the middle portions of the two CCD registers in FIG. 7), the fat zero charge 30a is transferred to the CCD register 60 by leaving a remaining charge 30b at the CCD register 30 (as a charge 60a excluding a remaining fat zero charge 30b). After that, at time t3, the drive pulse line SH1 connected to the shift register 20 is turned on to transfer signal charges 30c from the photoelectric transfer elements 10 to the CCD register 30 alternately (see FIG. 8), Further, when there exists a remaining charge 30b, at time t4, the drive pulse line TG connected to the transfer gate 50 is turned on to transfer the signal charges 30c together with the remaining fat zero charge 30b from the CCD register 30 to the CCD register 60 (see FIG. 9), because the remaining fat zero charge 30b still remains at the first CCD register 30. After that, at time t5, the drive pulse line SH2 connected to the shift register 20 is turned on to transfer signal charges 30d from the remaining photoelectric transfer elements 10 to the CCD register 30 alternately (see FIG. 10).

Figure 11:
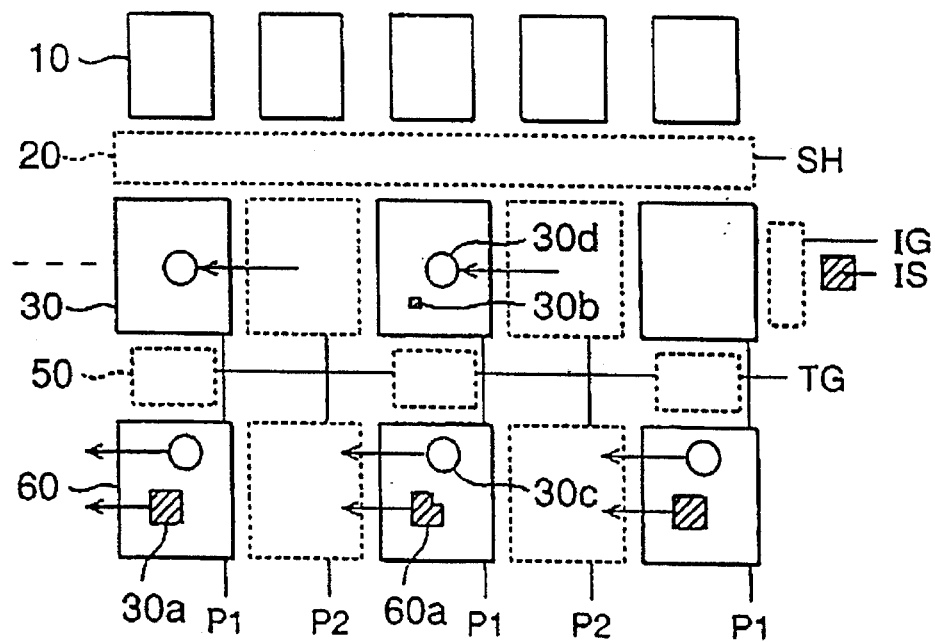
Figure 12:
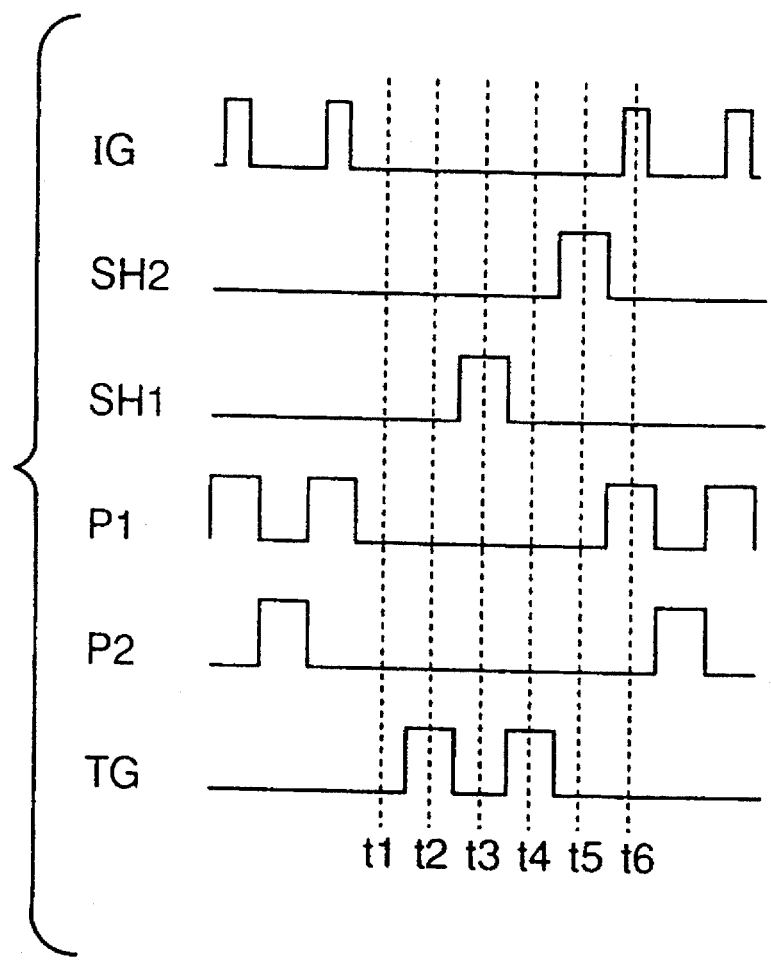
FIG. 12 is a charge transfer timing chart of the first embodiment of the solid state image sensing device.

Further, at time t6, the signal charges 30d are shifted within the CCD register 30 to join the remaining fat zero charge 30b on the basis of two-phase pulses P1 and P2 (see FIG. 11). The joined charges are outputted through an output buffer (not shown). In the same way, the signal charges 30c are shifted within the CCD register 60 to join the signal charges 30c with the fat zero charge 30a or 60a on the basis of the two-phase pulses P1 and P2 (see FIG. 11). The joined charges are outputted through an output buffer (not shown).

As described above, since the signal charges transferred from the photoelectric transfer elements 10 alternately are joined with the fat zero charges and the remaining charges, it is possible to obtain the signal charge (30d+30b) obtained by adding the normal signal charge 30d and the remaining fat zero charge 30b, the signal charge (30c+30a) obtained by adding the signal charge 30c and the normal fat zero charge 30a, and the signal charge (30d+60a) obtained by adding the signal charge 30d and the small fat zero charge 60a, in addition to the normal signal charges 30c and 30d.

Figure 13:
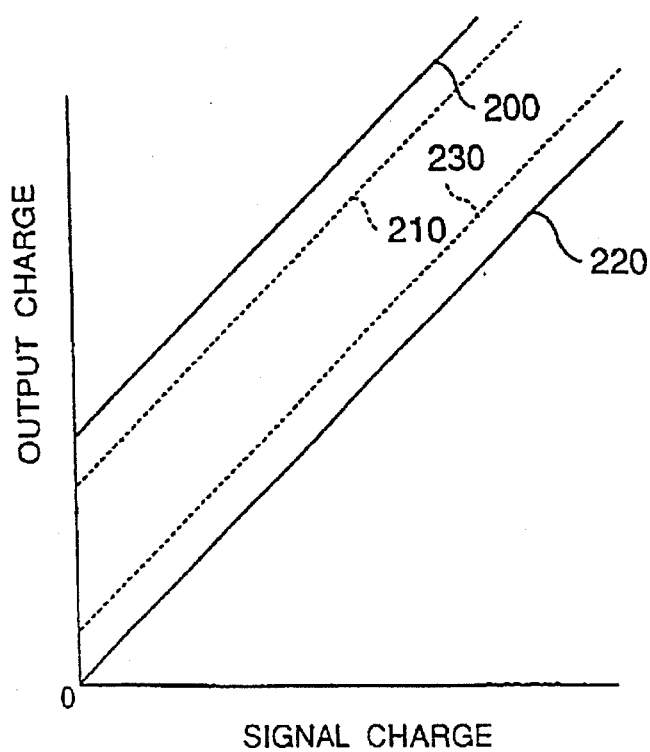
FIG. 13 is a characteristic diagram showing the relationship between the signal charge and the output charge output after transfer between the registers in the image sensing device according to the present invention.
Figure 14:
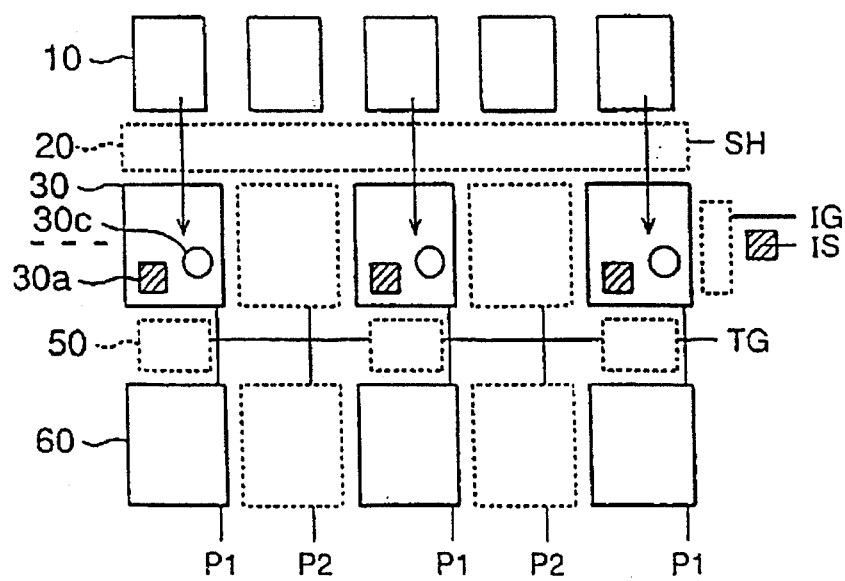
FIGS. 14 to 17 are partial plan views for assistance in explaining the operation of a second embodiment of the solid state image sensing device according to the present invention.

FIG. 13 shows the relationship between the magnitude of the signal charge and the magnitude of the output charge obtained after transfer between the two CCD registers 30 and 60 at this time; that is, FIG. 13 shows the characteristics showing the dependency of the magnitude of the output charge of the image sensing device upon the magnitude of the signal charge obtained by the photoelectric transfer elements in this embodiment. In FIG. 13, the ordinate indicate the output charge magnitude and the abscissa indicates the signal charge magnitude. In FIG. 13, since the non-linear characteristics are maintained when the signal charge magnitude is small, although the offset rate changes according to the presence or absence of the remaining charges, it is possible to correct the signals easily along the linear characteristics. In FIG. 13, the line 200 designates the output charge having no remaining charge of the register 60; the line 210 designates the output charge having the remaining charge of the register 60; the line 220 designates the output charge having no remaining charge of the register 30; and the line 230 designates the output charge having the remaining charge of the register 30, respectively.

A second embodiment of the present invention will be described herein below with reference to FIGS. 14 to 18. Further, in the respective embodiments described later, the assumption is made that there exists a defect in the charge transfer path between the CCD 31 (see FIG. 7) of the CCD register 30 and the CCD 61 (see FIG. 7) of the CCD register 60, in the same way as with the case of the first embodiment.

Figure 15:
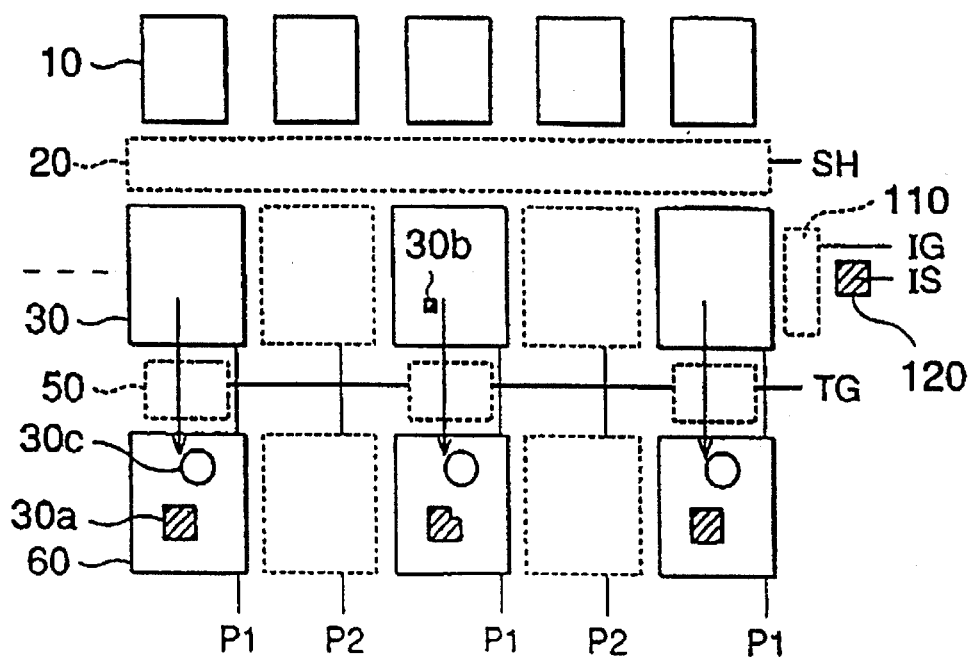
Figure 16:
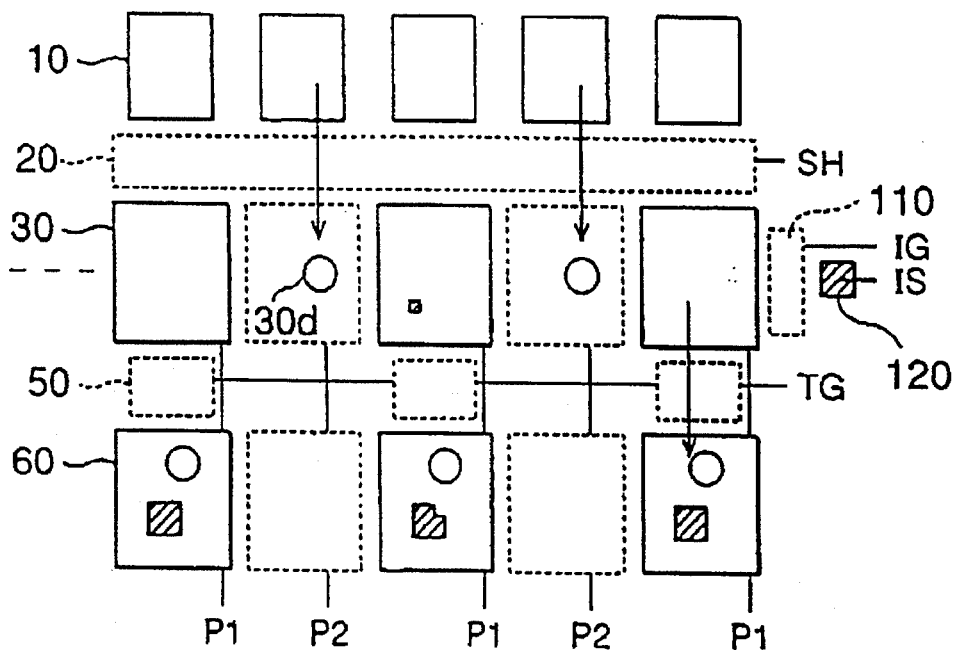

The feature of this second embodiment is that the signal charge is joined with the fat zero charge, and after that the joined charges are transferred from the CCD register 30 to the CCD register 60. First, in the same way as explained with reference to FIG. 3, at time t1, the drive pulse line IG connected to the input section 110 and the drive pulse line SH1 connected to the shift register 20 are both turned on to inject the fat zero charges 30*a* from the input section 110 to the CCD register 30. Further, at time t2, the signal charges 30*c* of the photoelectric transfer elements 10 are transferred to the CCD register 30 alternately (see FIG. 14). Then, at time t3, the drive pulse line TG connected to the transfer gate 50 is turned on to transfer the signal charges 30*c* and the fat zero charge 30*a* from the CCD register 30 to the CCD register 60 (see FIG. 15). At this time, the fat zero charge shown at the middle in FIG. 15 is transferred by leaving the remaining fat zero charge 30*b* in the CCD register 30. Next, at time t4, the drive pulse line SH2 connected to the shift register 20 is turned on to transfer the signal charges 30*d* from the photoelectric transfer elements 10 to the CCD register 30 alternately (see FIG. 16).

Further, at time t5, the signal charges 30*d* are shifted within the CCD register 30 on the basis of the two-phase pulses P1 and P2 to join the signal charges 30*d* with the remaining fat zero charge 30*b* (see FIG. 17), and then outputted through the output buffer. In the same way, the signal charges 30*c* are shifted within the CCD register 60 on the basis of the two-phase pulses P1 and P2 to join the signal charges 30*c* with the fat zero charge 30*a* (see FIG. 17), and then outputted through the output buffer. In the same way as with the case of the first embodiment, since the signal charges transferred from the photoelectric transfer elements 10 alternately are joined with the fat zero charges and the remaining charges, it is possible to obtain the signal charge (30*d*+30*b*) obtained by adding the normal signal charge 30*d* and the remaining fat zero charge 30*b*, the signal charge (30*c*+30*a*) obtained by adding the signal charge 30*c* and the normal fat zero charge 30*a*, and the signal charge (30*c*+60*a*) obtained by adding the signal charge 30*c* and the small fat zero charge 60*a*, in addition to the normal signal charges 30*c* and 30*d*.

In this second embodiment, the dependency of the magnitude of the output charge upon the magnitude of the signal charge is the same as shown in FIG. 13. Since the non-linear characteristics are maintained when the signal charge magnitude is small, although the offset rate changes according to the presence or absence of the remaining charge, it is possible to correct the signals easily along the linear characteristics.

In the above-mentioned embodiments, to join the signal charges with the fat zero charges, it is possible to generate the fat zero charges by irradiating bias light upon the photoelectric transfer elements. Further, at the register 60 at which the signal charges are joined with the fat zero charges, since the magnitude of the transfer charge is larger than that of the register 30, it is necessary to use the COD register 60 having a higher maximum charge transfer rate, as compared with that of the CCD register 30.

Figure 7:
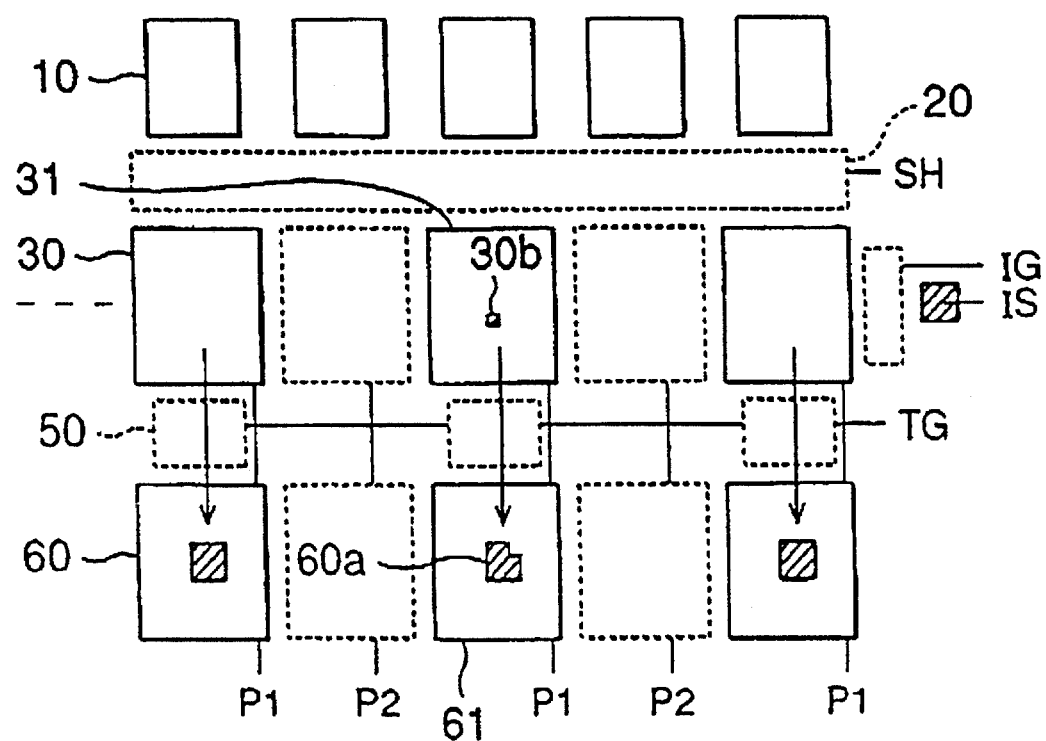
FIGS. 7 to 11 are partial plan views for assistance in explaining the operation of a first embodiment of the solid state image sensing device according to the present invention.
Figure 8:
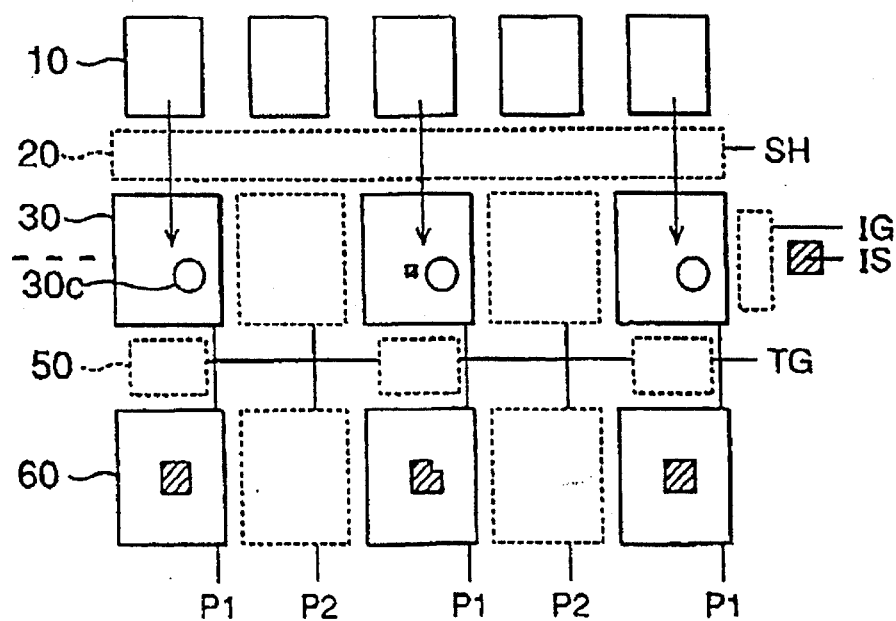
Figure 9:
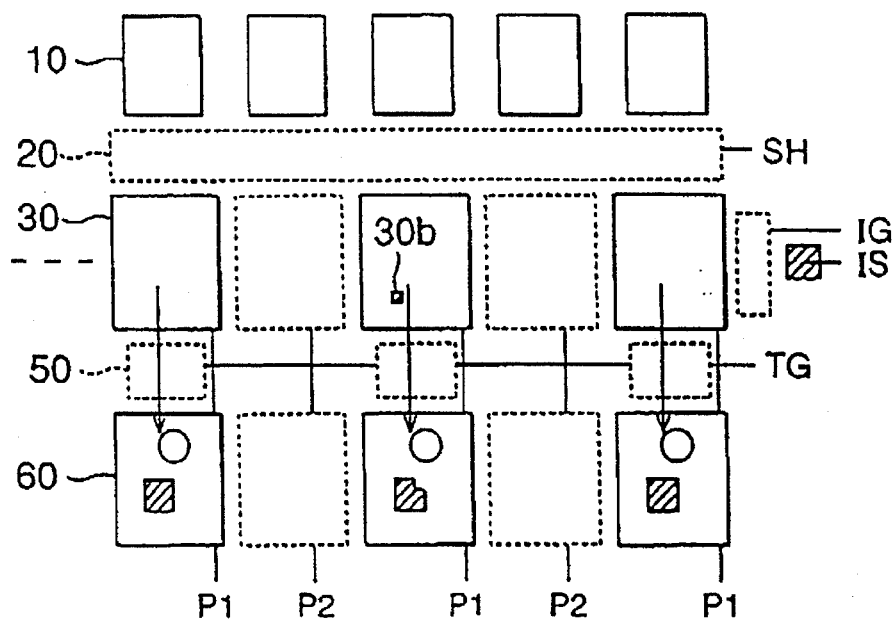

Further, in the case of the first embodiment, it is possible to obtain the real signal charge magnitude by transferring the charges in the CCD registers to the output section in FIG. 7 and further by subtracting the outputted charge from the output charges transferred from the CCD registers in the operation shown in FIG. 11.

Figure 17:
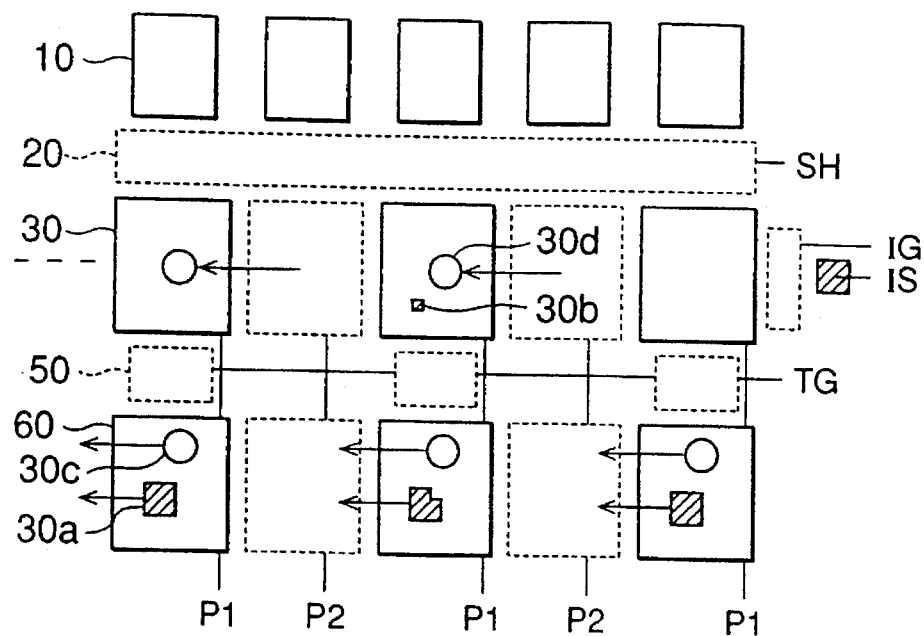
Figure 18:
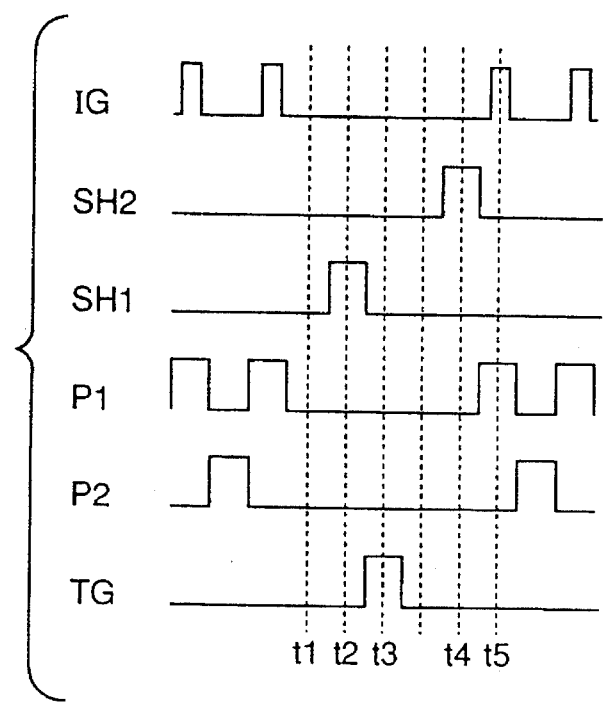
FIG. 18 is a charge transfer timing chart of the second embodiment of the solid state image sensing device.
Figure 19:
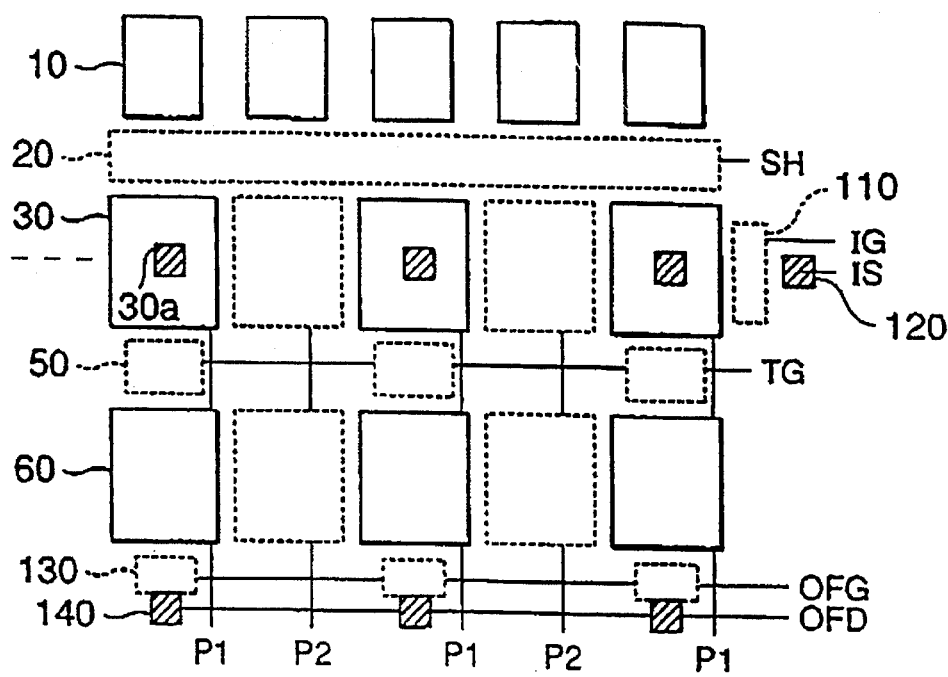
FIGS. 19 to 24 are partial plan views for assistance in explaining the operation of a third embodiment of the solid state image sensing device according to the present invention.

Further, in the second embodiment, it is possible to obtain the real signal charge magnitude by outputting the charges in the CCD registers to the outside when the signal charges are being transferred from the COD register 30 the CCD register 60 as shown in FIG. 15 and then by subtracting the outputted signal charges from the outputted charges transferred in the operation shown in FIG. 17.

Further, in the above-mentioned embodiments, the signal charges are transferred once between the CCD registers. However, when the signal charges are transferred several times, it is necessary to retrain the remaining charges the same electrode while the signal charges are transferred between the CCD registers. This case will be described hereinbelow.

A third embodiment corresponding to this case will be described hereinbelow with reference to FIGS. 19 to 25. The feature of this third embodiment is to provide charge discharging sections 130 and 140 for discharging the charges of the CCD register 60. The charge discharging section 130 is composed of polysilicon electrodes formed on the semiconductor substrate 100 and connected to a drive pulse line OFG. Further, the charge discharging section 140 is composed of impurity diffusion regions formed in the surface of the semiconductor substrate 100 and connected to a drive pulse line OFD.

The operation of this third embodiment will be explained hereinbelow. First, at time t1, the drive pulse line IG connected to the input section 110 is turned on to inject the fat zero charges 30*a* from the input section 110 to the CCD register 30 (see FIG. 19). Then, at time t2, the drive pulse line TG connected to the transfer gate 50 is turned on to transfer the fat zero charges 30*a* from the CCD register 30 to the CCD register 60 (see FIG. 20). At this time, the fat zero charge at the middle of the CCD register 30 is transferred to the CCD register 60 by leaving the remaining fat zero charge 30*b* thereat. After that, at time t3, the drive pulse line OFG connected to the charge discharging section 130 is turned on to transfer the fat zero charges 30*a* of the CCD register 60 to the charge discharging section 140 so that the fat zero charges 30*a* ere removed from the register transfer path (see FIG. 21).

Figure 22:
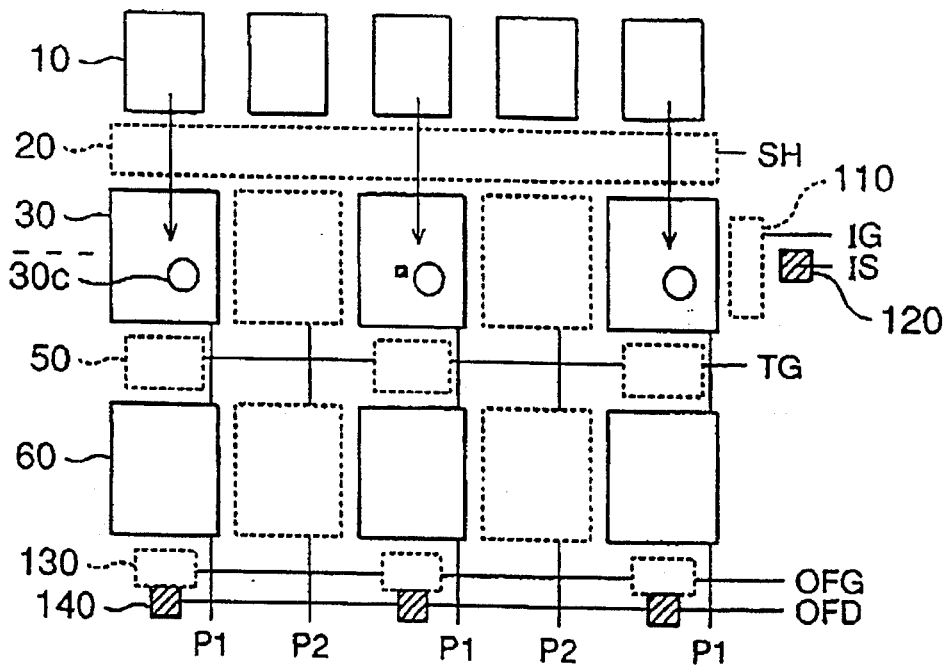
Figure 23:
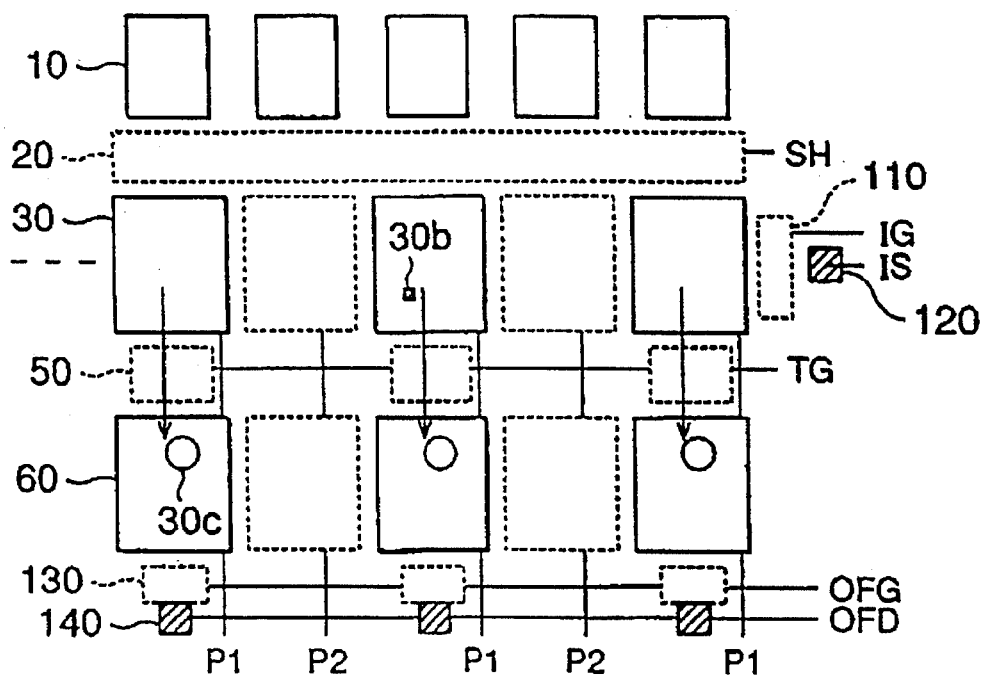
Figure 24:
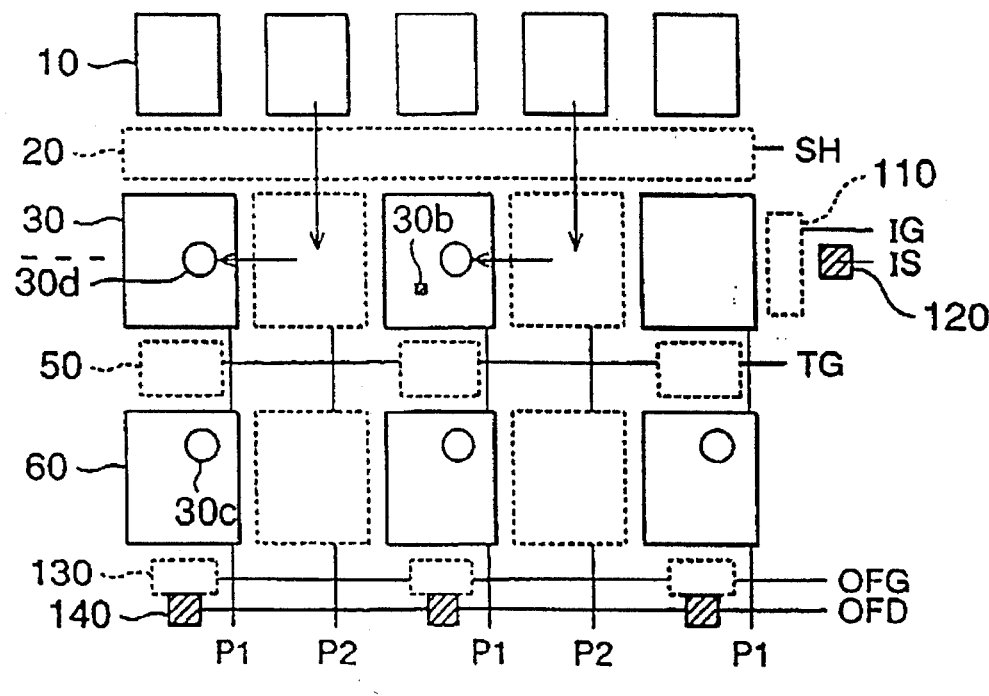
Figure 25:
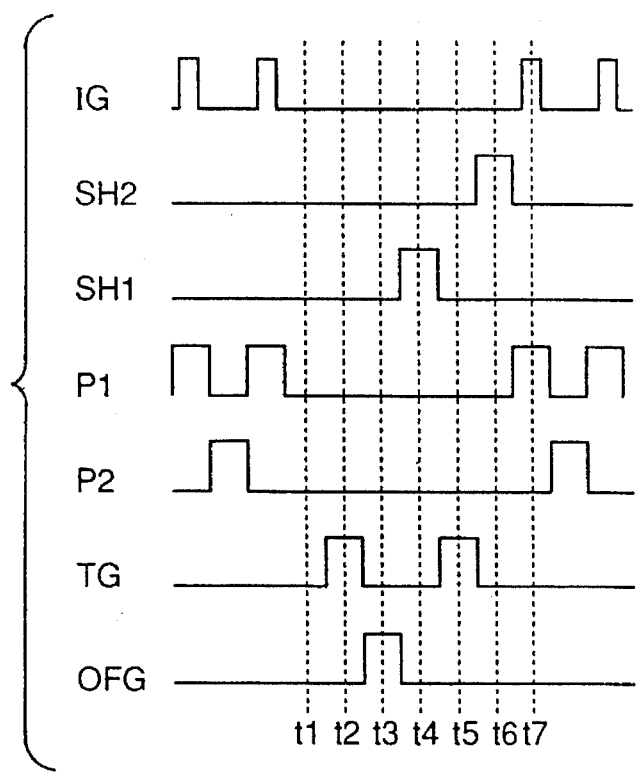
FIG. 25 is a charge transfer timing chart of the third embodiment of the solid state image sensing device.
Figure 26:
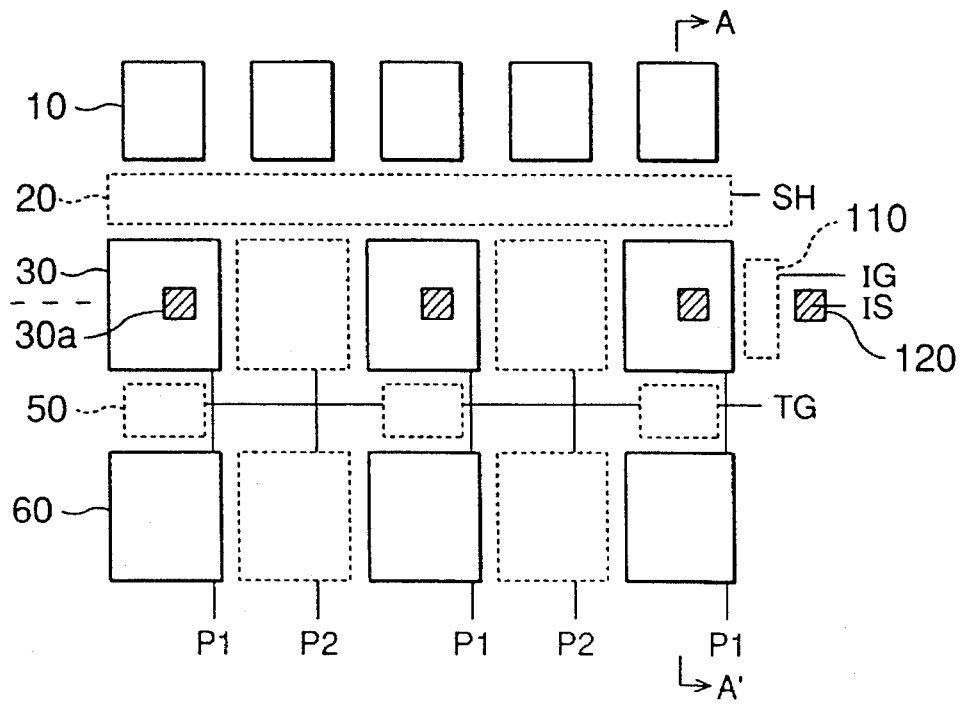
FIGS. 26 to 31 are partial plan views for assistance in explaining the apparition of a fourth embodiment of the solid state image sensing device according to the present invention.
Figure 27:
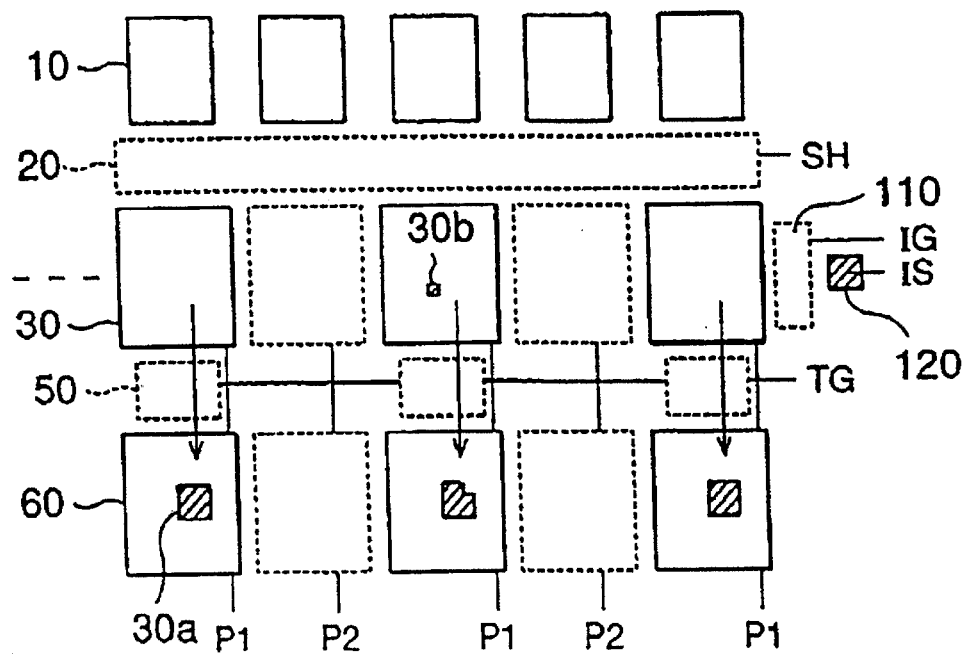
Figure 28:
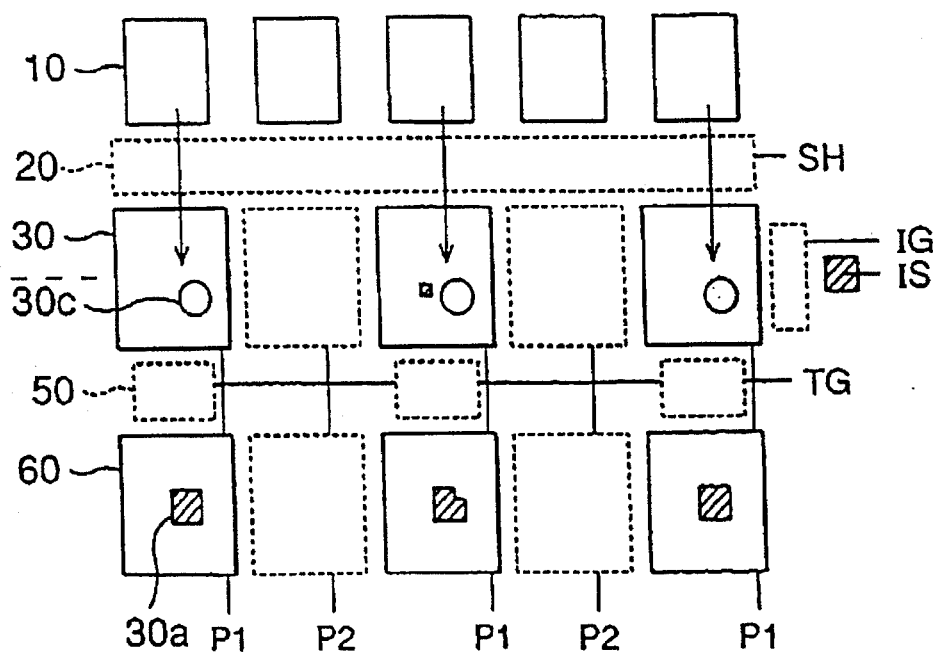
Figure 29:
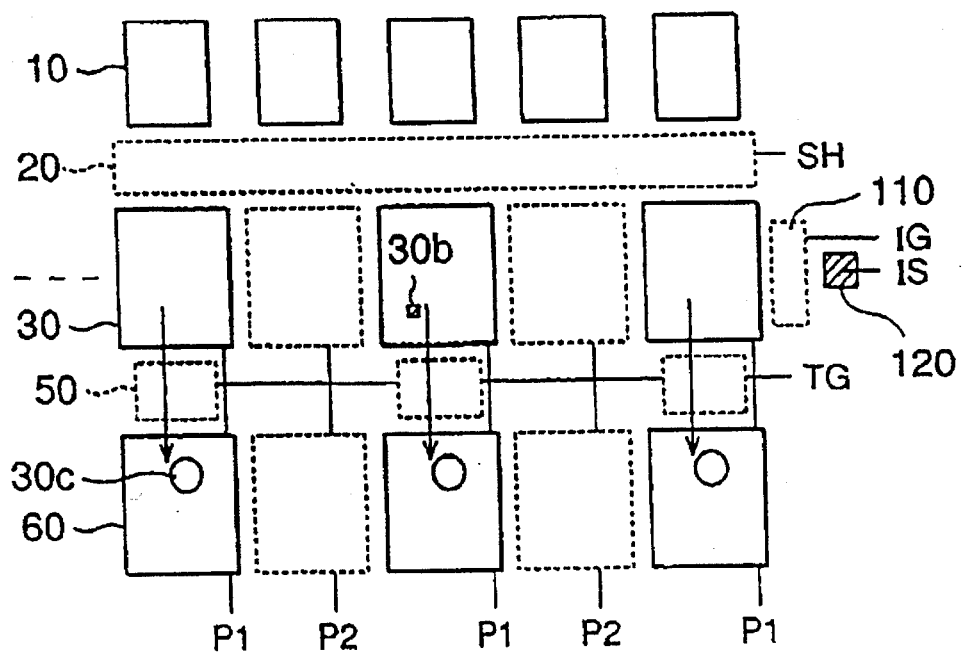
Figure 30:
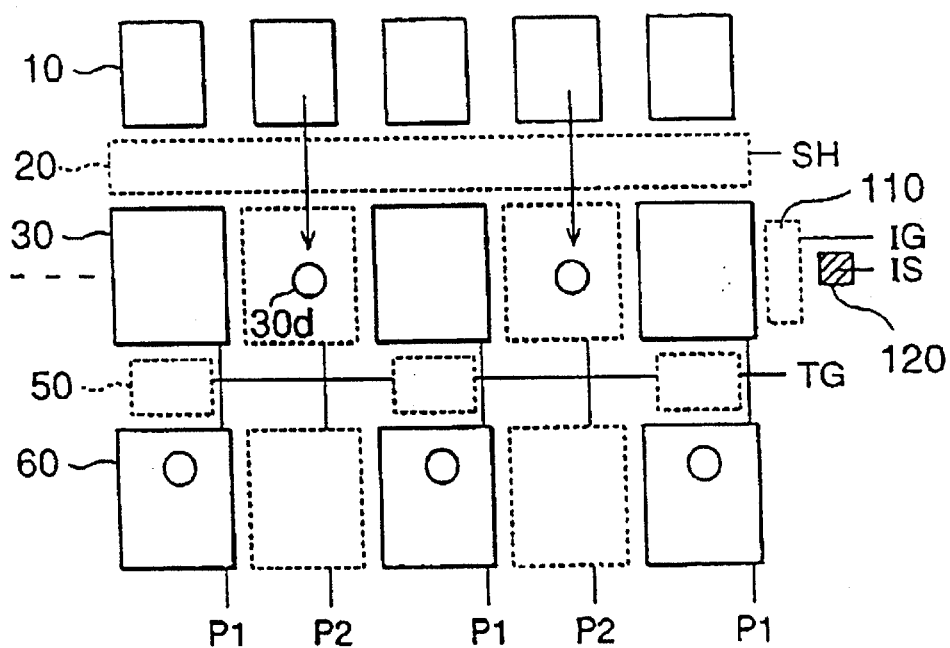
Figure 31:
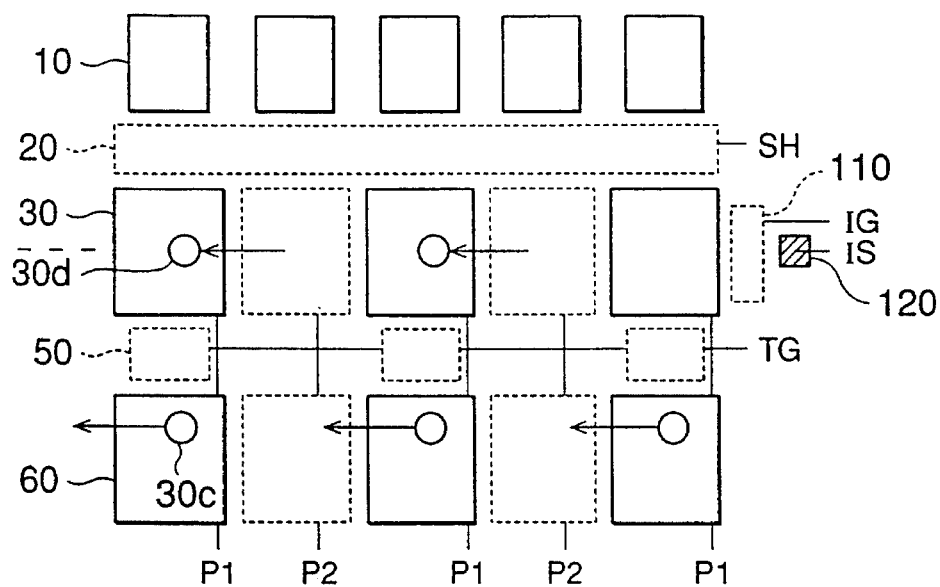
Figure 32:
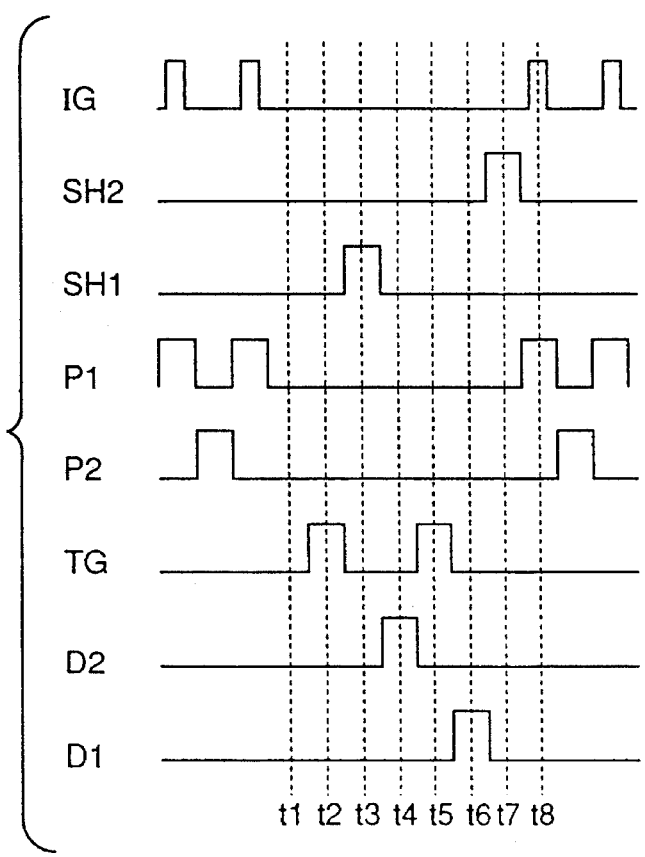
FIG. 32 is a charge transfer timing chart of the fourth embodiment of the solid state image sensing device.

Further, at time t4, the drive pulse line SH1 connected to the shift register 2 is turned on to transfer the signal charges of the photoelectric transfer elements 10 to the CCD register 30 alternately (see FIG. 22). Further, at time t5, when there exists a remaining charge, the signal charges 30*c* are transferred from the CCD register 30 to the CCD register 60 together with the remaining fat zero charge (see FIG. 23). The remaining fat zero charge 30*b* still remains at the CCD register 30. Next, at time t6, the drive pulse line SH2 connected to the shift register 20 is turned on to transfer the signal charges from the remaining photoelectric transfer elements 10 to the CCD register 30 alternately. After that, at time t6, the signal charges 30*d* are shifted within the CCD register 30 on the basis of the two-phase pulses P1 and P2 to join the signal charge 30d with the remaining fat zero charge 30b (see FIG. 24), and the joined charges are outputted through an output buffer. In the same way, the signal charges 30c are shifted within the CCD register 60 on the basis of the two-phase pulses P1 and P2 and outputted through an output buffer.

Figure 20:
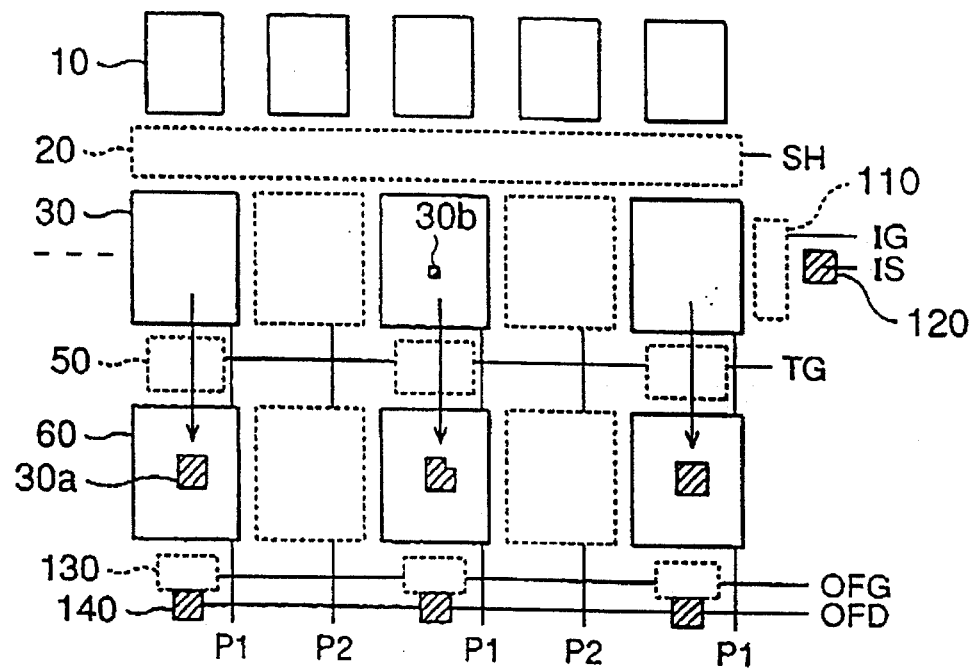
Figure 21:
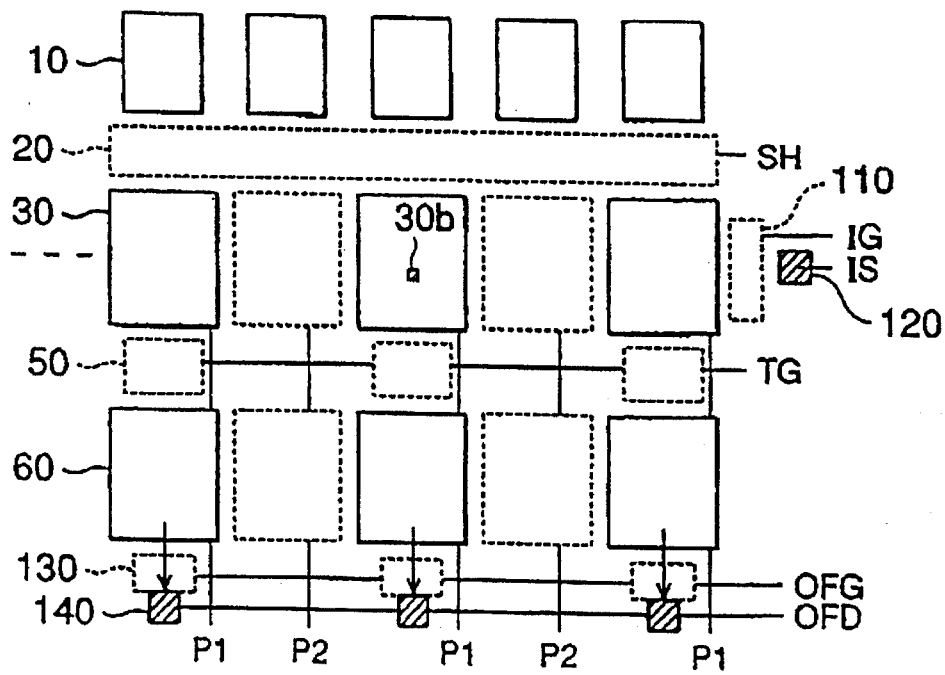

After the fat zero charge has been transferred from the CCD register 30 to the CCD register 60 as shown in FIG. 20, since the charges of the CCD register 60 are discharged, the charge added to the signal charge is only the remaining fat zero charge, so that it is possible to reduce the magnitude of the charge to be transferred between the CCD registers 30 and 60. Further, since the fat zero charge is not added to the signal charge, the signal charge is not subjected to the influence of noise included in the fat zero charge. Further, instead of the charge discharging section, it is also possible to provide another set of the transfer gate and the CCD register in the vicinity of the CCD register 60 to transfer the fat zero charge to the additional CCD register.

Figure 33:
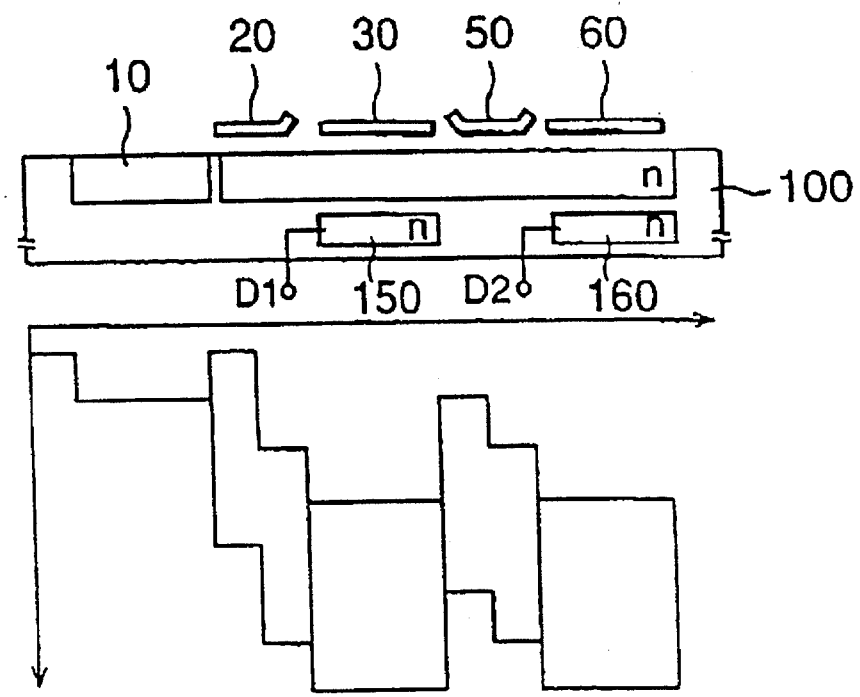
FIG. 33 is a cross-sectional view taken along a line A—A' in FIG. 26.

A fourth embodiment will be described hereinbelow with reference to FIGS. 26 to 33. The feature of this embodiment is that the charges of the register 60 are discharged perfectly immediately before the signal charges are transferred between the two CCD registers and in addition the remaining fat zero charges in the CCD register 30 are discharged before the succeeding signal charges are transferred. Further, FIG. 33 is a cross-sectional view showing the semiconductor substrate 100 taken along the line A—A' shown in FIG. 26. In this fourth embodiment, the charge discharging sections 150 and 160 (see FIG. 33) are additionally formed to discharge the charges in the CCD registers 30 and 60, respectively. These charge discharging sections 150 and 160 are formed by N-type impurity diffusion regions buried just under the register electrodes 30 and 60, respectively, and connected to drive pulse lines D1 and D2, respectively.

The operation of this fourth embodiment will be described. First, at time t1, the drive pulse line IG connected to the input section 110 is turned on to inject the fat zero charges 30a from the input section 110 to the CCD register 30 (see FIG. 26). Then, at time t2, the drive pulse line TG connected to the transfer gate 50 is turned on to transfer the fat zero charges 30a from the CCD register 30 to the CCD register 60 (see FIG. 27). At this time, the fat zero charge at the middle of the CCD register 30 is transferred to the CCD register 60 by leaving the remaining fat zero charge 30b at the CCD register 30. After that, at time t3, the drive pulse line SH1 connected to the shift register 20 is turned on to transfer the signal charges of the photoelectric transfer elements 10 to the CCD register 30 alternately (see FIG. 28). Further, at time t4, the drive pulse line D2 connected to the charge discharging section 160 is turned on to discharge the fat zero charges 30a of the CCD register 60. Further, at time t5, when there exists the remaining charge, the signal charges 30c are transferred from the CCD register 30 to the CCD register 60 together with the remaining charge (see FIG. 29). In this case, the remaining fat zero charge 30b remains at the CCD register 30.

Further, at time t6, the drive pulse line D1 connected to the charge discharging section 150 is turned on to discharge the remaining fat zero charge 30b at the CCD register 30. Further, at time t7, the drive pulse line SH2 connected to the shift register 20 is turned on to transfer the signal charges 30d of the remaining photoelectric transfer elements 10 to the CCD register 30 alternately (see FIG. 30). After that, at time t8, the signal charge 30d are shifted within the CCD register 30 on the basis of the two-phase pulses P1 and P2 (see FIG. 31), and then outputted through an output buffer.

In the same way, the signal charges 30c are shifted within the CCD register 60 on the basis of the two-phase pulses P1 and P2, and then outputted through an output buffer.

In this embodiment, since the charges of the register 60 are discharged completely immediately before the signal charges are transferred between the CCD registers and further the remaining charges in the register 30 are discharged before the succeeding signal charges are transferred, it is possible to obtain the perfect output signal charges having no remaining charges.

As described above, in the present invention, since the fat zero charges are injected to the CCD register and since the remaining signal charges can be kept constant, after the transfer between the two CCD registers, irrespective of the magnitude of the signal charges, it is possible to easily correct the signals even if remaining signal charges are generated. Further, when the remaining charges are discharged, it is possible to eliminate the remaining signal charges.

What is claimed is:

1. A solid state sensing device, comprising:

photoelectric transferring means composed of a plurality of photoelectric transfer elements arranged in a straight line for transducing incident light into signal charges;

at least first and second charge transfer paths arranged in parallel to the photoelectric transfer elements and each having a plurality of charge coupled devices, the first charge transfer path being electrically connected to the photoelectric transfer elements for transferring the signal charges;

charge transferring means for transferring the signal charges from said photoelectric transferring means to said first charge transfer path at a first timing and for transferring the signal charges transferred to said first charge transfer path to said second charge transfer path at a second timing;

said charge transferring means including a shift register through which the first charge transfer path is electrically connected to the photoelectric transfer elements;

a drive pulse line connected to the shift register, drive pulses being supplied to the shift register through the drive pulse line to transfer the signal charges from the photoelectric transferring means to the first charge transfer path at the first timing; and charge supplying means, electrically connected to the first charge transfer path, for applying a bias charge to the signal charges to be transferred from said first charge transfer path to said second charge transfer path.

2. The solid state image sensing device of claim 1, wherein said charge supplying means comprises a charge input drain region for transducing incident light into the bias charge and a charge input electrode for applying the bias charge to the signal charges to be transferred, both the charge input drain region and electrode being formed on a semiconductor substrate.

3. The solid state image sensing device of claim 2, wherein the charge supplying means includes another drive pulse line connected to the electrode, drive pulses being supplied to the electrode through the another drive pulse line to apply the bias charge to the signal charges at a third timing.

4. The solid state image sensing device of claim 1, which further comprises discharging means electrically connected at least to the second charge transfer path for removing the bias charge from the signal charges and discharging at least the transferred bias charge from said second charge transfer path.

5. The solid state image sensing device of claim 4, wherein the discharging means includes a first discharge section composed of at least one electrode formed on a semiconductor substrate on which the solid state image sensing device is formed and a second discharge section composed of at least one impurity diffusion region formed in a surface of the semiconductor substrate.

6. The solid state image sensing device of claim 5, further comprising another drive pulse line connected to the electrode, drive pulses being supplied to the electrode through the another drive pulse line to discharge the bias charge from the second charge transfer path at a third timing.

7. The solid state image sensing device of claim 4, wherein the discharging means includes a first discharge section provided under the first charge transfer path and a second discharge section provided under the second charge transfer path, the first and second discharge sections being composed of impurity diffusion regions.

8. The solid state image sensing device of claim 7, further comprising:
   a first drive pulse line connected to the first discharge section, drive pulses being supplied to the first discharge section through the first drive pulse line to discharge the bias charge from the first charge transfer path at a third timing; and
   a second drive pulse line connected to the second discharge section, drive pulses being supplied to the second discharge section through the second drive pulse line to discharge the bias charge from the second charge transfer path at a fourth timing.

9. The solid state image sensing device of claim 1, wherein the second charge transfer path has a higher maximum charge transfer rate than that of the first charge transfer path.

10. The solid state image sensing device of claim 1, wherein the charge transferring means comprises:
    a transfer gate through which the first charge transfer path is electrically connected to the second charge transfer path; and
    another drive pulse line connected to the transfer gate, drive pulses being supplied to the transfer gate through the another drive pulse line to transfer the signal charges from the first charge transfer path to the second charge transfer path at the second timing.

11. A method of transferring charges in a solid state image sensing device having photoelectric transfer elements for transducing incident light into signal charges, at least first and second charge transfer paths for transferring the signal charges, the first charge transfer path being connected to the photoelectric transfer elements, and charge transferring means for transferring the signal charges between the first and second charge transfer paths, said charge transferring means including a shift register through which the first charge transfer path is electrically connected to the photoelectric transfer elements, and a drive pulse line connected to the shift register, drive pulses being supplied to the shift register through the drive pulse line to transfer the signal charges from the photoelectric transfer elements to the first charge transfer path at a first timing, the method comprising the steps of:
    supplying a bias charge to the first charge transfer path;
    transferring the bias charge from the first charge transfer path to the second charge transfer path;
    supplying the signal charges through the shift register to the first charge transfer path;
    transferring the signal charges from the first charge transfer path to the second charge transfer path; and
    outputting both signal charges and the bias charge from the second charge transfer path.

12. The method of transferring charges in a solid state image sensing device of claim 11, in which the outputting step includes discharging the bias charge at least from the second charge transfer path by applying potential higher than the bias charge at least to the second charge transfer path.

13. The method of transferring charges in a solid state image sensing device of claim 11, wherein before the signal charges are transferred to the second charge transfer path, the bias charge is outputted from the second charge transfer path; and the outputted bias charge is subtracted from a charge composed of the signal charge and the bias charge both outputted from the second charge transfer path, to obtain a signal output charge.

14. The method of transferring charges in a solid state image sensing device of claim 11, wherein the bias charge is transferred from the first charge transfer path to the second charge transfer path before the signal charges are supplied to the first charge transfer path.

15. The method of transferring charges in a solid state image sensing device of claim 11, wherein the bias charge and the signal charges are transferred to the second charge transfer path after the signal charges are supplied to the first charge transfer path.

16. The method of transferring charges in a solid state image sensing device of claim 11, further comprising the step of outputting a remaining bias charge from the first charge transfer path.

17. The method of transferring charges in a solid state image sensing device of claim 11, wherein the bias charge is outputted from the second charge transfer path before the signal charges are supplied to the first charge transfer path.

18. The method of transferring charges in a solid state image sensing device of claim 11, wherein the bias charge is outputted from the second charge transfer path before the signal charges are transferred from the first charge transfer path to the second charge transfer path.

19. A method of transferring charges in a solid state image sensing device having photoelectric transfer elements for transducing incident light into signal charges, at least first and second charge transfer paths for transferring the signal charges, the first charge transfer path being connected to the photoelectric transfer elements, charge transferring means for transferring the signal charges between the first and second charge transfer paths, said charge transferring means including a shift register through which the first charge transfer path is electrically connected to the photoelectric transfer elements, and a drive pulse line connected to the shift register, drive pulses being supplied to the shift register through the drive pulse lie to transfer the signal charges from the photoelectric transfer elements to the first charge transfer path at a firs timing, the method comprising the steps of:
    supplying a bias charge to the first charge transfer path;
    transferring the bias charge from the first charge transfer path through the shift register to the second charge transfer path;
    outputting the bias charge from the second charge transfer path;
    supplying the signal charges to the first charge transfer path after the bias charge is outputted from the second charge transfer path;
    transferring the signal charges from the first charge transfer path to the second charge transfer path together with a remaining bias charge; and
    outputting both the signal charges and the remaining bias charge from the second charge transfer path.

* * * * *